United States Patent
Blohm

(10) Patent No.: US 11,919,042 B2
(45) Date of Patent: Mar. 5, 2024

(54) INTELLIGENT MAIL ROUTING USING DIGITAL ANALYSIS

(71) Applicant: Nicole Blohm, Mount Pleasant, SC (US)

(72) Inventor: Nicole Blohm, Mount Pleasant, SC (US)

(73) Assignee: Ricoh Company, LTD., Tokyo (JP)

( * ) Notice: Subject to any disclaimer, the term of this patent is extended or adjusted under 35 U.S.C. 154(b) by 166 days.

(21) Appl. No.: 17/145,027

(22) Filed: Jan. 8, 2021

(65) Prior Publication Data

US 2022/0219202 A1 Jul. 14, 2022

(51) Int. Cl.

| | |
|---|---|
| *B07C 3/14* | (2006.01) |
| *G06F 40/279* | (2020.01) |
| *G06V 10/40* | (2022.01) |
| *G06V 30/10* | (2022.01) |
| *G06V 30/40* | (2022.01) |

(52) U.S. Cl.
CPC .............. *B07C 3/14* (2013.01); *G06F 40/279* (2020.01); *G06V 10/40* (2022.01); *G06V 30/40* (2022.01); *G06V 30/10* (2022.01)

(58) Field of Classification Search
CPC ....... B07C 3/14; G06F 40/279; G06F 40/253; G06F 40/30; G06V 10/40; G06V 30/40; G06V 30/424
See application file for complete search history.

(56) References Cited

U.S. PATENT DOCUMENTS

| | | | | | |
|---|---|---|---|---|---|
| 5,464,099 | A | * | 11/1995 | Stevens | B43M 7/02 414/403 |
| 5,557,515 | A | * | 9/1996 | Abbruzzese | G06Q 10/063114 705/7.15 |
| 2009/0084713 | A1 | * | 4/2009 | Miller | B07C 3/00 209/584 |
| 2010/0100468 | A1 | * | 4/2010 | Spector | G06Q 20/405 705/35 |
| 2019/0005348 | A1 | * | 1/2019 | Walsh | G06Q 10/0838 |
| 2019/0180097 | A1 | * | 6/2019 | Ferguson | G06N 3/02 |
| 2019/0334849 | A1 | * | 10/2019 | Bostick | H04L 12/1895 |
| 2020/0134307 | A1 | * | 4/2020 | Mirjan | G06V 30/416 |

* cited by examiner

*Primary Examiner* — King Y Poon
*Assistant Examiner* — Michael L Burleson
(74) *Attorney, Agent, or Firm* — Hickman Becker Bingham Ledesma LLP

(57) ABSTRACT

In an embodiment, an apparatus comprises one or more processors and one or more memories communicatively coupled to the one or more processors and storing instructions which, when processed by the one or more processors, cause: capturing a digital image of one or more contents of the item of mail using the image capture device; extracting, by an image processing device, information from one or more of the image of the item of mail or the image of the one or more contents of the item of mail, the extracted information comprising identifying data and characteristic data; based, at least in part, on the characteristic data, determining a priority level for the item of mail; causing displaying, on a client computing device, a graphical user interface comprising the identifying data and the priority level for the item of mail.

18 Claims, 8 Drawing Sheets

| Type | Date Received | Sender | Sender Address | Addressed to | Priority | | |
|---|---|---|---|---|---|---|---|
| Standard | 23 September 2020 | J. Q. Adams | 141 Franklin St. Quincy, MA 02169 | Jared Marco | Medium | Quickview | Details |
| Priority | 11 November 2020 | P. F. Hamilton | 7531 Center Ln Brentwood, CA 94513 | Junko Enoshima | High | Quickview | Details |
| First Class | 13 September 2020 | Rocinante Shipping | 3426 Mission St. Arlington, VA 216 | | | Quickview | Details |
| Priority | 8 August 2020 | Secretariat | 5417 Westwood Los Angeles, CA | | | Quickview | Details |

| Type | Date Received | Sender | Sender Address | Addressed to | Priority | | | |
|---|---|---|---|---|---|---|---|---|
| Standard | 23 September 2020 | J. Q. Adams | 141 Franklin St, Quincy, MA 02169 | Jared Marco | Medium | Quickview | Details | ▪▪▪ |
| Priority | 11 November 2020 | P. F. Hamilton | 7531 Center Ln Brentwood, CA 94513 | Junko Enoshima | High | Quickview | Details | ▪▪▪ |
| First Class | 13 September 2020 | Rocinante Shipping | 3426 Mission St. Arlington, VA 21604 | Amos Alex | High | Quickview | Details | ▪▪▪ |
| Priority | 8 August 2020 | Secretariat | 5417 Westwood Blvd. Los Angeles, CA 90024 | Bill Bright | Low | Quickview | Details | ▪▪▪ |

602:
Forward
Reject
Delete
Mark as Spam
Archive
Physical Delivery
Export

FIG. 6

INTELLIGENT MAIL ROUTING USING DIGITAL ANALYSIS

RELATED APPLICATIONS

The present disclosure relates to U.S. Pat. No. 10,558,883B2, the entire contents of which are incorporated by reference as if fully set forth herein.

FIELD

The technical field of the present disclosure relates to improved methods, systems, computer software, and/or computer hardware in the field of mail services. The disclosure relates more specifically to improved computer-implemented methods and systems for analyzing mail information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large companies are often inundated with physical mail. Acting on such a high quantity of physical mail can be extremely difficult and time consuming, especially when no information is known about the mail items ahead of time. Digitization of mail through image capture can help with the processing of mail, but still leaves behind a large amount of visual information to process, all of which is given equal attention despite some items being more urgent or important than others. When lackluster information is provided to a user, the user cannot make an intelligent choice as to how to act with respect to the mail items.

SUMMARY

The appended claims may serve as a summary. In an embodiment, an apparatus comprises one or more processors and one or more memories communicatively coupled to the one or more processors and storing instructions which, when processed by the one or more processors, cause: capturing a digital image of one or more contents of the item of mail using the image capture device; extracting, by an image processing device, information from one or more of the image of the item of mail or the image of the one or more contents of the item of mail, the extracted information comprising identifying data and characteristic data; based, at least in part, on the characteristic data, determining a priority level for the item of mail; causing displaying, on a client computing device, a graphical user interface comprising the identifying data and the priority level for the item of mail.

BRIEF DESCRIPTION OF THE DRAWINGS

The present invention is illustrated by way of example, and not by way of limitation, in the figures of the accompanying drawings and in which like reference numerals refer to similar elements.

FIG. 5 depicts an example improved graphical user interface where a quickview option has been selected.

FIG. 6 depicts an example improved graphical user interface where an options option has been selected.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. GENERAL OVERVIEW
II. SYSTEM ARCHITECTURE
   A. Processing and Management System
   B. Database
   C. Network
III. PROCEDURAL OVERVIEW
IV. PRIORITY DETERMINATION
V. CATEGORY DETERMINATION
VII. IMPROVED DISPLAYS AND INTEGRATION
VIII. IMPLEMENTATION MECHANISMS I. General Overview According to various embodiments, computer-implemented apparatus, methods, and systems are provided that enable intelligent delivery of mail. These intelligent delivery services include receiving and canning images of UAA mail and extracting data by performing OCR or scanning encoded data, identifying a sender and a recipient of the UAA mail, determining priority levels or categories of mail, and providing improved interfaces for viewing the items of mail.

The services may also include causing performance of actions based on categories of mail and/or priorities. The actions may include grouping items of mail, displaying special indicators with items of mail, forwarding, deleting, storing, or rejecting items of mail, or integrating the items of mail into one or more other systems.

While mail scanning services provide benefits for UAA mail, such services are often unable to display the scanned items in a beneficial manner, such that the display gives a viewer the necessary information to act on the item of mail. This often causes users to initiate the same action with respect to each item of mail without making individual decisions. Additionally, such limited scanning reduces the usefulness of digitizing mail items where multiple items could receive the same treatment.

Technical benefits include improved computer and system efficiency by shifting the computer storage, memory, and processing burdens of determining categories and priorities of mail from the receiver. This decreases the excessive use of network bandwidth, as well as decreases the use of processing resources, such as CPU usage, and memory that the computing systems of the mail recipient would waste on displaying and storing a large number of images, many of which could be initially deleted if more information were available. The distributed system architecture also has the added benefit of distributing processing resources such that overburdening a single computer is avoided.

II. System Architecture

Figure 1:
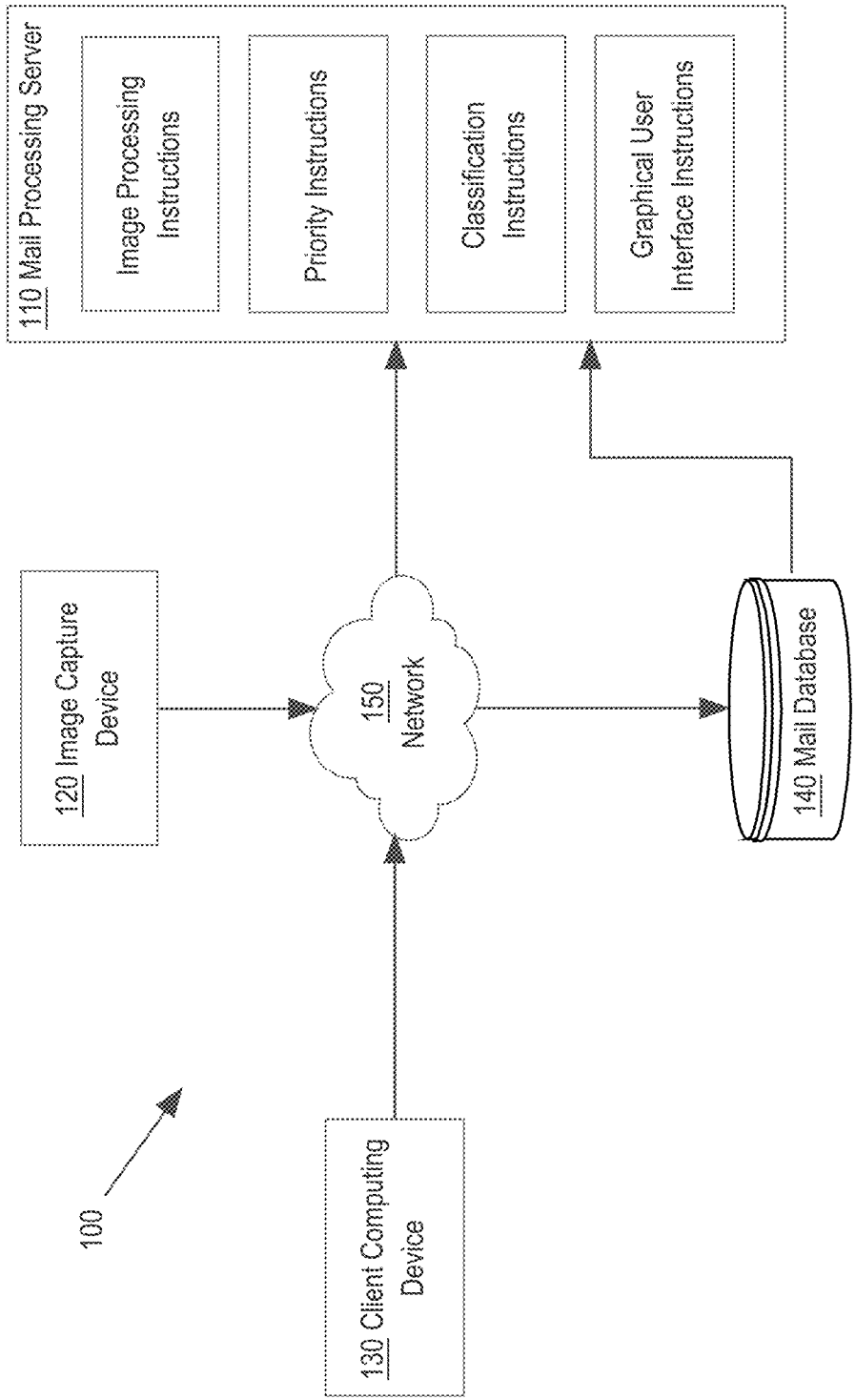
FIG. 1 depicts a networked computer system.

FIG. 1 depicts a networked computer system 100. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 depicts only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between a mail processing server 110, an image capture device 120, and a client computing device 130. The mail processing server 110 and image capture device 120 of FIG. 1 may represent or be associated with one or more computers that host or execute processes that provide the functions and operations that are described further herein. The networked computer system 100 is not limited the particular elements depicted in FIG. 1 and may include fewer or additional elements depending upon a particular implementation.

A. Processing and Management System

Mail processing server 110 may be a system configured to provide intake, processing, analysis, and management of UAA mail. Embodiments are depicted in the figures and described herein in the context of a single processing and management system 110 for the purposes of explanation, but any number of processing and management systems may be used.

The mail processing server 110 may be configured to analyze digital images of items of mail, execute actions with respect to the items of mail, and/or provide information, alerts, or other notifications to a client device 130 related to items of mail. Mail processing server 110 may additionally be configured to analyze other types of incoming communications, such as e-mail, text messages, in-app messages, and/or facsimiles, execute actions with respect to the other types of incoming communications, and/or provide information, alerts, or other notifications to the client device 130 related to the other types of incoming communications. In an embodiment, mail processing server 110 executes one or more of image processing instructions 112, priority instructions 114, classification instructions 116, and/or graphical user interface instructions 118.

Image processing instructions 112 comprise computer readable instructions which, when executed by mail processing server 110, cause mail processing server 110 to receiving incoming digital images of mail items, analyze the digital images of mail items to extract information, such as through optical character recognition (OCR), relate the digital images of mail items to stored profiles based on extracted information, and/or store digital images of mail items in a mail database 140.

Priority instructions 114 comprise computer readable instructions which, when executed by mail processing server 110, cause mail processing server 110 to analyze digital images of mail items to identify a priority for the mail items and/or cause performance of one or more actions with respect to the items of mail based on a determined priority. Priority instructions 114 may include instructions for identifying a priority using natural language processing and/or other machine learning techniques.

Classification instructions 116 comprise computer readable instructions which, when executed by mail processing server 110, cause mail processing server 110 to analyze digital images of mail items to identify a category for the mail items and/or cause performance of one or more actions with respect to the items of mail based on a determined category. Classification instructions 116 may include instructions for identifying categories using machine learning techniques. Classification instructions 116 may further include instructions for generating analytics related to different categories of mail.

Graphical user interface instructions 118 comprise computer readable instructions which, when executed by mail processing server 110, cause mail processing server 110 to generate a graphical user interface and cause display of the graphical user interface on client computing device 130. The graphical user interface may depict information related to received items of mail, images of received items of mail, priority information, category information, or other analytics. The graphical user interface may further include options for specifying actions to perform for individual items of mail, for categories of mail, for priority classifications of mail, or for groupings of mail based on other characteristics. The graphical user interface may further include options for generating categories or priority classifications for items of mail to improve existing machine learning systems.

The image capture device 120 comprises a device configured capture digital images of mail. The image capture device 120 may be located within a mail facility and be configured to capture an image of an address-bearing face of the mail. The image capture device 120 may additionally be configured to capture images of contents of mail items. For example, the image capture device 120 may be configured to open items of mail and scan the contents of the items of mail. In an embodiment, the image capture device 120 is configured to determine whether to open an item of mail to scan the contents based on an analysis of an image of the address-bearing face of the item of mail. For example, the image capture device 120 may use an OCR scan of the address-bearing face of the item of mail to identify a recipient and may determine, based on stored data, whether to open the item of mail and scan the contents based on the identified recipient.

The client computing device 130 may be any type of client device 130 or a combination of client devices, including but not limited to one or more server computers, personal computers, laptops, smart phones, or the like.

Although embodiments are depicted in the figures and described herein in the context of a single client computing device 130, embodiments are not limited to this example and any number of client computing devices may be used. For example, client computing device 130 may be multiple computers acting in conjunction with a web server to display a graphical user interface depicting information relating to items of mail.

B. Database

In an embodiment, mail data may be retrieved from mail database 140. As used herein, the term "database" refers to a corpus of data, organized or unorganized, in any format, with or without a particular interface for accessing the corpus of data. Mail database 140 may comprise information regarding customers associated with a mail facility. The mail database 140 may include information such as customer name, addresses, phone numbers, digital addresses, usernames, role data for different users, stored preference data for customers, previous mail information, including images and metadata, such as time of arrival, weight, size, or color, and/or other customer or mail related data.

C. Network

Network 150 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 150 and the disclosure presumes that all elements of FIG. 1 are communicatively coupled via network 150. The various elements depicted in FIG. 1 may also communicate with each other via direct communications links that are not depicted in FIG. 1 for purposes of explanation.

III. Procedural Overview

In an embodiment, the networked computer system 100 provides mail services to one or more customers. The mail services may include scanning an address-bearing face of incoming mail items, opening mail items, scanning contents of mail items, and/or sorting mail items to be personally delivered, destroyed, forwarded, or stored. As an example, when a mail item is received at the networked computer system 100, the image capture device 120 may scan the mail item and/or the contents of the mail item. The mail processing server 110 or image capture device 120 may analyze the scanned data, such as through OCR of text followed by textual analysis. Based on input from a client device, the networked computer system 100 may then perform a specified action with respect to the mail item.

In an embodiment, the networked computer system 100 provides a graphical user interface to a client computing device 130. The graphical user interface may provide options for generating new rules for performing actions with received mail items with the rules identifying actions to perform with incoming mail items. In an embodiment, the rules pair an action to perform with one or more attributes of the mail item, such as a sender address, recipient address, identified category, identified priority, or other data extracted from the mail item.

In an embodiment, the graphical user interface provides analytics to client computing device 130. The analytics may include graphs depicting percentages of incoming mail in different categories, number of mails items reviewed over different periods of time, amount of time prior to performing an action on a mail item, percentages of mail items on which different actions were performed, number of mail items that have not been processed or on which an action has not been performed, and/or other analytics relating to the mail items or actions taken on the mail items.

In an embodiment, the graphical user interface provides information relating to individual items of mail. For example, the graphical user interface may depict, for each of a plurality of items of mail, one or more of a sender address, a recipient address, a receive date, a mail type, a sender name, a recipient name, a priority, a category, or other information extract from the mail item. The graphical interface may additionally include options to perform actions for individual items of mail. When input is received identifying an action to perform for an individual item of mail, the networked computing system 100 may cause performance of the action.

IV. Priority Determination

In an embodiment, a system generates priority determinations for received items of mail. The priority determinations may be used to generate an improved display that highlights priority items and/or displays priority items before other types of mail items. The priority determinations may additionally be used to generate alerts, select actions to perform, adjust notification settings, and/or generate analytics.

Figure 2:
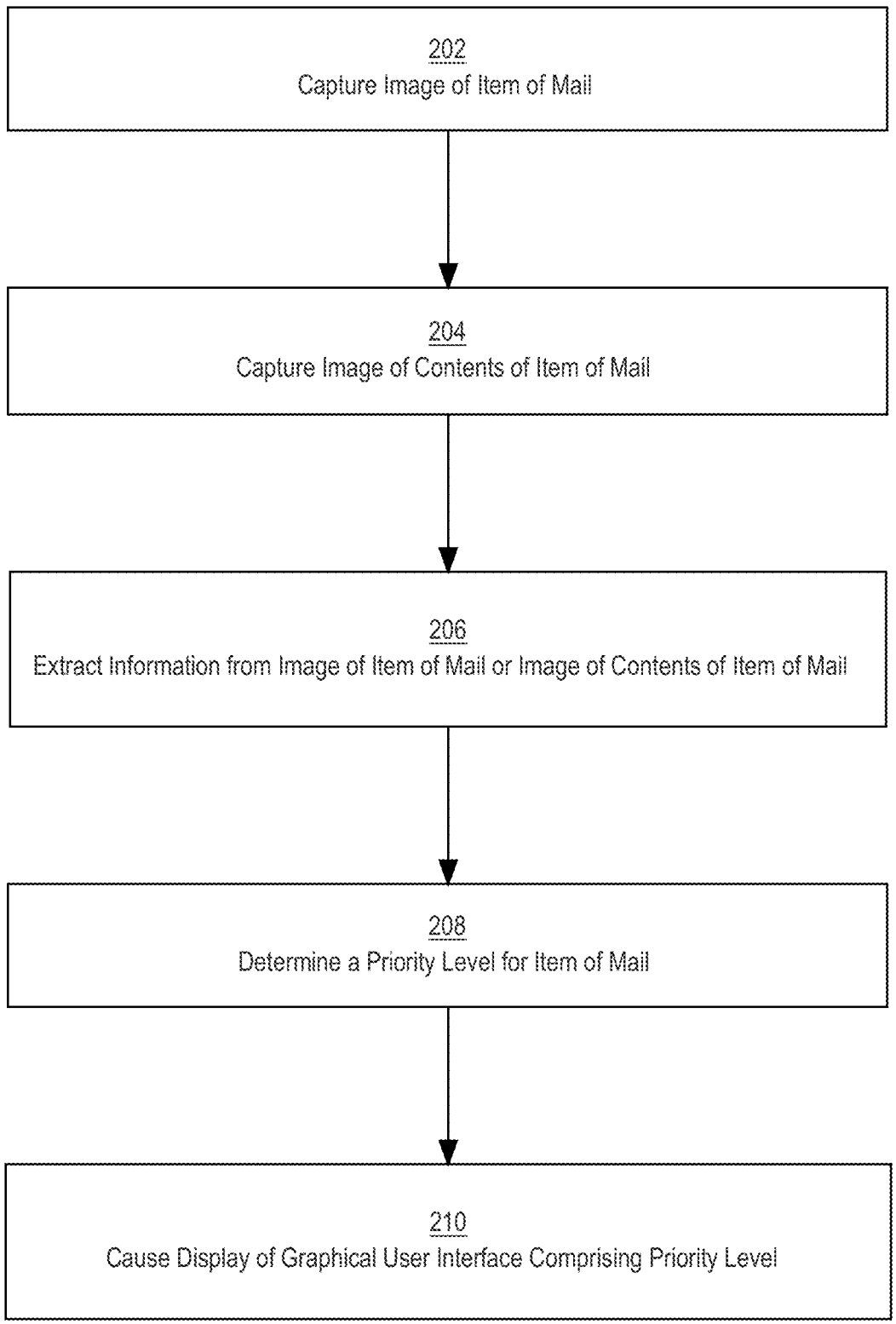
FIG. 2 is a flow diagram that depicts a method or algorithm for mail services.

FIG. 2 depicts an example method for generating priority determinations from physical items of mail. FIG. 2 may serve as an algorithm or instructions for programming the functional elements of the networked computing system 100 to perform the operations described below.

At step 202, an image of an item of mail is captured using an image capture device. For example, an incoming mail item may be scanned by an image capture device. The image capture device may send the scanned image to a server computer, such as mail processing server 110. At step 204, an image of one or more contents of the item of mail is captured using the image capture device. For example, an image capture device may scan the contents of incoming mail. The contents may be manually removed from the envelope of the mail item and/or automatically removed by one or more mechanical components of the image capture device. In an embodiment, the image capture device scans each page of the contents. In other embodiments, the image capture device scans a subset of the pages, such as a first page of the contents.

While FIG. 2 and other methods described herein recite capturing an image of the contents of mail items, embodiments may be practiced where only the incoming mail item is scanned. For example, an image of the item of mail may be captured in step 202 and information may be extracted from the image of the item of mail in step 206. The priority level may then be determined based on the data extracted from the image of the item of mail, such as based on a sender name or address, recipient name or address, or type of mail.

At step 206, information is extracted from the image of the item of mail or the image of the contents of the item of mail. The extracted information may include identification data and characteristic data. Identification data, as used herein, refers to identifiers of senders or recipients, such as name and address. For example, the image capture device or server computer may OCR image of the mail item and/or the image of the contents of the mail item. Information may be extracted from the OCR text of the mail item and/or contents. For instance, a mailing address and mailing name may be captured from an address portion of an envelope. A return name and return name may be captured from a return portion of the envelope. Characteristic data, as used herein, refers to characteristics of the item of mail, such as a mail type, whether handwriting or a printed label is used, types of font, including highlighting, bolding, or capitalization, and/or characteristics of the contents of the mail, such as an image of the contents, words used in different locations in the contents, and/or format of the contents. A type of mail, such as first class or priority, may be captured through image recognition on the envelope and/or metadata received along with the mail item. Similarly, a document title or due date may be captured from a document.

At step 208, a priority level for the item of mail is determined. A priority level, as used herein, refers to a determined importance for reviewing or responding to an item of mail. A high priority level, as used herein, refers to an item of mail with a high determined importance for reviewing or responding. The priority level may be determined to be high, medium, or low, using methods described herein where an item of mail is categorized as having a high priority level based on one or more criteria. The priority level may be determined based on a category of the document, as determined using the methods described further herein, machine learning, natural language processing to determine tone, identifications of due dates, and/or other information extracted from the documents.

In an embodiment, priority levels are determined using category information. For example, a particular category of a document may correspond to a particular priority level. Additionally or alternatively, different categories of documents may correspond to different rules for determining priority levels. For example, a document that is identified as an "Office Action" may have a priority level determined based on a field in the document identifying a mailing date and a current date. For example, if a current date is over two months after the mailing date, the system may determine that the document is of a "high" priority, while if the current date is between one month and two months from the mailing date, the system may determine that the document is of a "medium" priority. Thus, priority levels for documents may change over time, moving into higher priorities as a due date approaches.

In an embodiment, the server computer uses a machine learning system to determine priority of a document. For example, a machine learning system may be trained with a plurality of documents received for a user and corresponding priority levels as training datasets. The inputs into the machine learning system may comprise fields in the document, title of the document, other words or phrases in the document, a type of mail by which the document was sent, a sender name and/or address, a recipient name and/or address, or other features extracted from the document. The outputs for the machine learning system may comprise different priority levels, such as a low level, medium level, or high level. Any categorization machine learning system and/or regression system may be used.

In another embodiment, natural language processing techniques may be used on the document to determine the priority level. For example, natural language processing may be used on OCR-ed words from the document and/or on the image of the document to determine an overall sentiment of the document. Sentiment may refer to a polarity of a document, such as positive, negative, or neutral, or an emotional state, such as angry, sad, or happy. Any known natural language processing techniques may be used to determine emotions, categories, and/or other attitude information from the document. Based on the results of the natural language processing techniques, the system may determine a priority level for the document. For example, documents that are categorized as "angry" or "urgent" may be identified as high priority documents while other documents may be categorized as "low" or "medium" priority documents.

Other rules may be executed to determine priority levels for documents. The rules may include rules that specify priority levels based on a sender of a document, a recipient of a document, and/or other values identified within the document. For example, documents sent to a first recipient may be identified as being a high priority document, while documents sent to a second recipient may be identified as a low priority document. As another example, due dates, mailing dates, or other extracted values may correspond to different priority levels.

In an embodiment, any combination of the above systems may be used to identify a priority level of a document. For example, a document may be given a highest priority level of priority levels determined for the document using different techniques. For instance, if natural language processing techniques identify the document as a "low" priority document, but a due date extracted from the document indicates that the document is a "medium" priority document, the system may identify the document as a medium priority document. In other embodiments, priority levels may be cumulative. For example, the different methods described above may each add a value to a cumulative priority level score. As a practical example of such, an "angry" determination may add 15 to the cumulative priority level score while a due date within the next month adds 20 to the cumulative priority level score. If the cumulative priority level score exceeds a first threshold value, the system may label the document as "medium" priority, while if the cumulative priority level score exceeds a second threshold value, the system may label the document as "high" priority. The different values set for different rules may be determined by customer preferences and/or predetermined by the system.

Similar methods may be used to determine priority levels from digital communications, such as e-mail, text messages, in-app messages, and/or facsimiles. By additionally determining priority levels for different types of communications the systems and methods described herein allow for improved displays which include priority levels for both physical mail items and digital communications.

At step 210, the system displays a graphical user interface comprising the priority level. The graphical user interface may identify the mail item using data extracted from the mail item, such as a receipt date, a sender name/address, a recipient name/address, a unique value assigned to the mail item, and/or any other identifying information. Along with the identifying information, the system may cause display of the priority level determined for the document. By depicting the priority level in the graphical user interface, the system improves viewership of different mail items by drawing attention to mail items with higher priority. In other embodiments, the graphical user interface may be further modified based on priorities, such as by displaying higher priorities first, providing different displays for different levels of priority, or identifying higher priority items in other interfaces.

In an embodiment, the system causes performance of one or more actions based on the priority of the document. The one or more actions may include any of sending the captured digital image of the one or more contents of the item of mail to a client computing device, rejecting the item of mail, deleting the captured digital image of the one or more contents of the item of mail, causing the item of mail to be separated for physical delivery, or exporting the captured digital image of the one or more contents of the item of mail to a content management system.

In an embodiment, the one or more actions comprise sending one or more alerts to a client computing device. For example, the system may be configured to send an alert when a high priority mail item has been identified, when a mail item changes priority levels, when a threshold period of time has been passed without a mail item being reviewed where the threshold period of time is dependent on the priority level, or when a number of high priority mail items exceeds a threshold value. The threshold values described herein may be preconfigured at default values or may be configurable by a client computing device.

V. Category Determination

In an embodiment, a system identifies categories for received items of mail. The category determinations may be used to generate an improved display that displays categories of mail items, filters mail items by categories, and/or includes separate interfaces for different categories. The category determinations may additionally be used to generate alerts, select actions to perform, adjust notification settings, and/or generate analytics.

Figure 3:
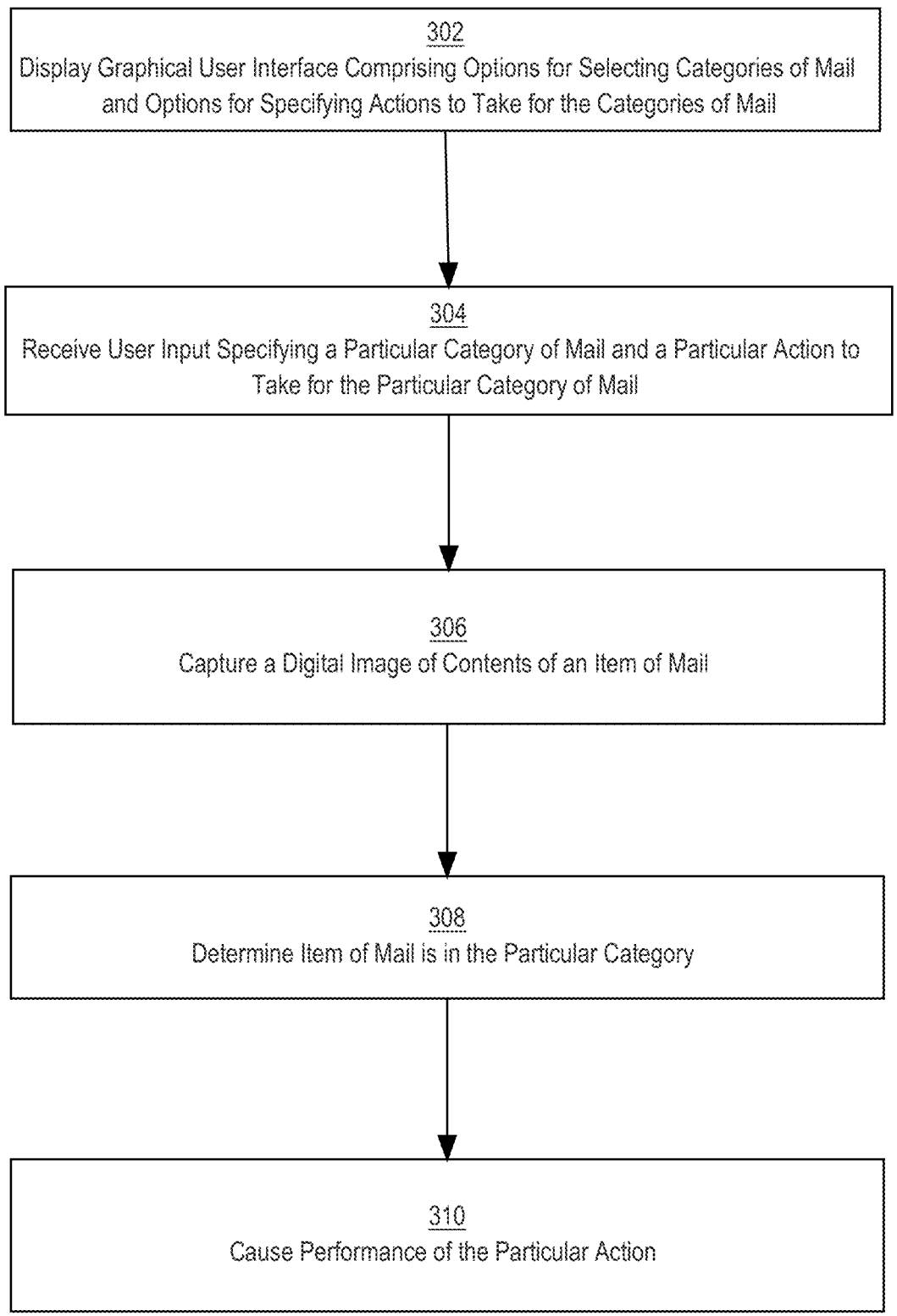
FIG. 3 is a block diagram that depicts an example computer system upon which embodiments may be implemented.

FIG. 3 depicts an example method for category determination of items of mail. FIG. 3 may serve as an algorithm or instructions for programming the functional elements of the networked computing system 100 to perform the operations described below.

At step 302, a graphical user interface is displayed on a client device comprising options for selecting categories of mail and options for specifying actions to take for the categories of mail. For example, a graphical user interface may include a rule generator which includes a field for category and a field for actions to perform. The category field may be populated with pre-stored categories provided by the server computer. Additionally or alternatively, the categories may be generated through a graphical user interface on a client computing device using the methods described herein. The actions to perform may include any one or more of sending a captured digital image of one or more contents of an item of mail to a client computing device, rejecting an item of mail, deleting a captured digital image of one or more contents of an item of mail, causing an item of mail to be separated for physical delivery, or exporting a captured digital image of the one or more contents of the item of mail to a content management system.

At step 304, user input is received specifying a particular category of mail and a particular action to perform for the particular category of mail. For example, a user may select a category and an action to perform through the graphical user interface displayed on the client device. The client device may send the selection to a server computer. The server computer may then store data identifying the category and the action to perform. Similar steps may be performed with a plurality of categories, thus generating rules for different categories of mail.

Steps 306-310 provide a method for processing an item of mail using category-based rules. Thus, in some embodiments, steps 306-310 may be performed using rules generated through steps 302 and 304 while in other embodiments, steps 306-310 may be performed using stored category-based rules provided through any other method, such as preprogrammed rules or selected rule templates. At step 306, a digital image of contents of an item of mail is captured. For example, an incoming mail item may be scanned by an image capture device. The image capture device may send the scanned image to a server computer, such as mail processing server 110.

In an embodiment, an image of one or more contents of the item of mail is captured using the image capture device. For example, an image capture device may scan the contents of incoming mail. The contents may be manually removed from the envelope of the mail item and/or automatically removed by one or more mechanical components of the image capture device. In an embodiment, the image capture device scans each page of the contents. In other embodiments, the image capture device scans a subset of the pages, such as a first page of the contents.

While FIG. 3 and other methods described herein recite capturing an image of the contents of mail items, embodiments may be practiced where only the incoming mail item is scanned. For example, an image of the item of mail may be captured in step 306 and information may be extracted from the image of the item of mail. The category may then be determined based on the data extracted from the image of the item of mail, such as based on a sender name or address, recipient name or address, or type of mail.

At step 308, based on the image, the system determines that the item of mail is in the particular category. For example, the mail processing server 110 may extract data from the envelope and/or the contents of the item of mail. Extracting data may include performing OCR on the image of the item of mail and/or contents of the item of mail. The OCR-ed images may then be analyzed to extract data from the images, such as by determining that information relates to a particular field based on its location on the item of mail and/or contents. For example, the system may determine that data in the center of the envelope corresponds to recipient information and may extract a name and address from recognized words in the center of the envelope. The mail processing server 110 may determine the category for the item of mail based on the extracted data.

In an embodiment, the system determines the category of the item of mail by evaluating one or more rules with respect to the extracted data. Example rules may specify categories of documents based on a recipient name or address extracted from an envelope, a sender name or address extracted from the envelope, one or more additional pieces of extracted from the envelope, such as a code, or data extracted from the documents, such as a title field on the document.

In an embodiment, a rule builder is provided through the graphical user interface on the client device to allow a user to specify rules for categorizing a document. The rules may include a sufficient clause based on data extracted from the item of mail and a necessary clause specifying a category. Options for specifying the sufficient clause may include pre-identified fields in a mail item, such as names or addresses which exist across all mail items. Other options for specifying the sufficient clause may include a field selector. The field selector may be used to specify a location on a face of an item of mail or contents of an item of mail that would include data that can be used to determine if an item of mail is within a specific category. For example, a claims document may include a header specifying a claim number. The field selector may be used to identify the header and a rule may be specified through the graphical user interface that states that a document is a claims document if it includes a claim number in the header.

In an embodiment, the system determines the category of the item of mail using one or more machine learning techniques. For example, the system may train a machine learning system, such as a neural network or other regression machine learning system, using a plurality of training datasets. The training datasets may include inputs comprising text fields, such as OCR-ed names, addresses, or fields in the contents of the mail items, and/or images, such as images of the envelope or images of the contents. The training datasets may additionally include outputs specifying the categories for the mail items of the inputs.

The training datasets may be generated through categorization of incoming mail items by a client device. For example, a graphical user interface may be displayed on a client device which displays an item of mail, such as an image of an envelope and/or image of the contents of the item of mail. A drop-down menu may be provided with options for existing or new categories. When a selection is made at the client device identifying a category for an item of mail, the server computer may generate a training dataset from the item of mail. Generating the training dataset may include extracting inputs from the mail item and storing the inputs with the category as the output. Inputs may be generated the same way across different items of mail, thereby allowing a same machine learning system to be used for each document with a null value being used when a value is not available in a specific field, such as a return address. As a practical example, if a mail item is specified as a claims document, the system may generate a training dataset with an output of "claims document" and an input comprising a sender name, a recipient name, a sender address, a recipient address, text of the first page of the contents of the mail item, and an image of the first page of the contents of the mail item. Where multiple types of data are used as inputs, such as texts and images, embeddings of different types of machine learning systems, such as recurrent neural networks and convolutional neural networks may be used.

Additionally or alternatively, a training dataset may include only one type of information. For instance, a classification neural network may use an image of the front page of the item of mail as input with the category as the output. Thus, the documents may be grouped into categories based on visual similarities over textual similarities or vice versa if text-based machine learning systems are used.

In an embodiment, combinations of the above techniques may be employed to determine categories. For example, some categories may be determined using a machine learning system where training datasets are available while other categories may be determined using rules where rules have been prestored or specified. In embodiments, rules based on different features may also be combined. For example, a first rule may state that a mail item belongs in category A if the sender name meets a particular criterion while a second rule may state that a mail item belongs in category B if a particular term is used in a field on a page of the contents of the item of mail. Rules may additionally include hierarchical relationships, such that a category can be chosen if two rules are both satisfied. Thus, if the first rule is at a higher hierarchical level, a document that meets the particular criterion will be determined to be in category A even if the particular term is used in the field on the page of the contents of the item of mail.

Similar methods may be used to determine categories from digital communications, such as e-mail, text messages, in-app messages, and/or facsimiles. By additionally determining categories for different types of communications the systems and methods described herein allow for improved displays which include categories for both physical mail items and digital communications.

At step 310, the system causes performance of the particular action. For instance, the system may perform sending a captured digital image of one or more contents of an item of mail to a client computing device, rejecting an item of mail, deleting a captured digital image of one or more contents of an item of mail, causing an item of mail to be separated for physical delivery, or exporting a captured digital image of the one or more contents of the item of mail to a content management system based on the action specified by the client device. In an embodiment, the type of action is specific to the category of mail. For instance, the claims document may include a claim number in a header of the document. A rule may specify that for a claims document, the claim number is extracted from a header of the document, a folder is identified that corresponds to the claim number, and the document is stored in the folder.

VI. Improved Displays and Integration

In an embodiment, the systems and methods described herein provide improvements to graphical user interfaces for depicting received mail by visually rearranging, grouping, and/or identifying determined priority levels for different mail items. Visually rearranging may include sorting identifiers of items of mail based on priority levels and/or displaying items of mail with different priority levels in different locations of an interface. Grouping may include establishing different sections and/or interfaces for different priority levels. For example, a general interface may include a visual indicator for high priority mail items which identifies a number of high priority mail items for review and includes a link which, when selected, navigates an interface view to one that depicts only the high priority mail items. Identifying the determined priority levels may be performed through visual indicators, such as changes in color, different text boxes, highlighting, and/or other visual indicators of priority.

Figure 4:
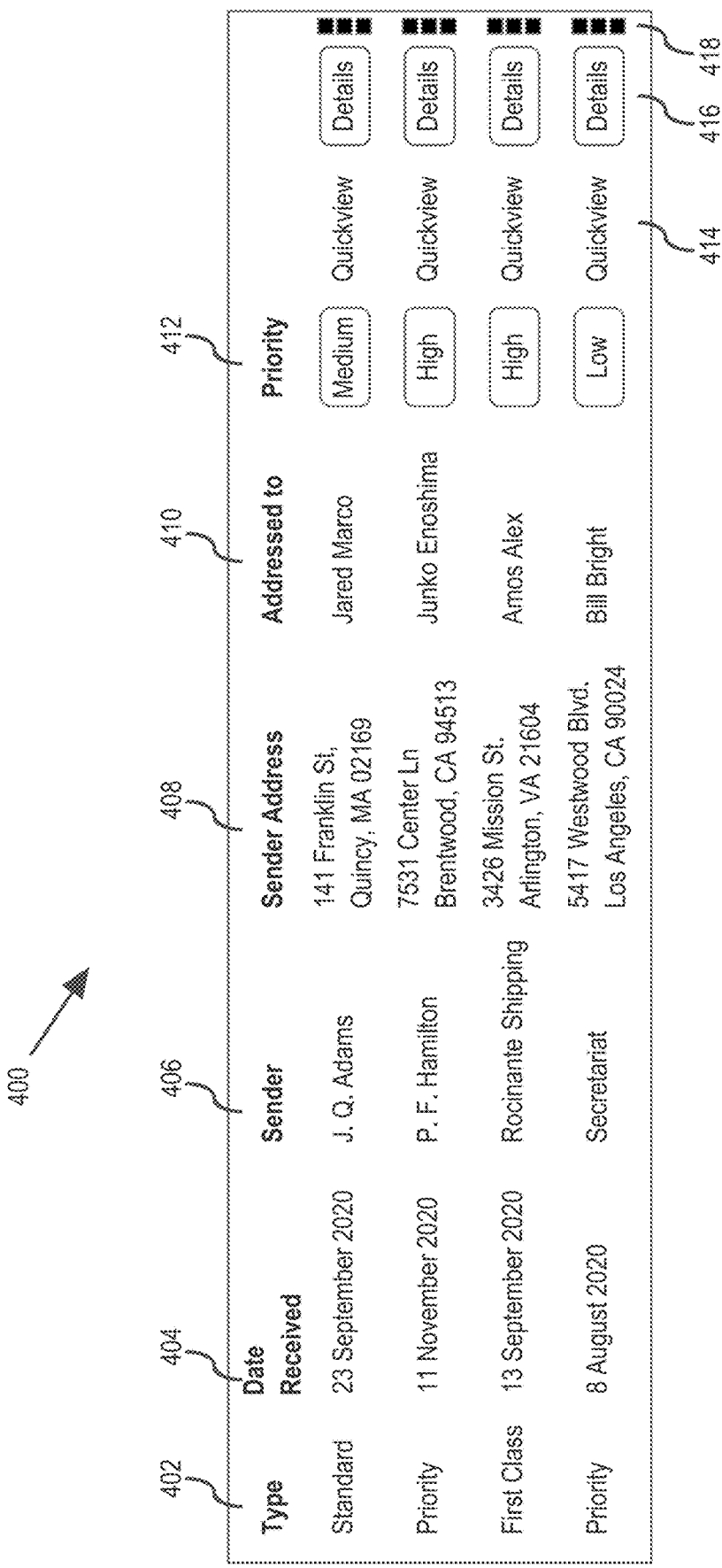
FIG. 4 depicts an example improved graphical user interface.

FIG. 4 depicts an example improved graphical user interface. Display 400 includes mail type 402, date received 404, sender 406, sender address 408, addressed to 410, priority 412, quickview 414, details 416, and options 418. Mail type 402 comprises a type of sending of the mail, such as through priority mail, standard, or first class. Mail type 402 may be received as metadata with an item of mail and/or extracted from an image of the item of mail. Date received 404 may comprise a date that mail item was received. The date received may be generated by the system when the mail item is scanned or during an initial stage when the mail item is catalogued. Sender 406, sender address 408, and addressed to 410 fields may be determined from extracted data from the item of mail. The priority 412 may be determined using the methods described herein. The priority 412 may be depicted in different colors, such as red for high priority mail, yellow for medium priority, and blue for low priority. Quickview 414 and options 418 are described further herein in FIG. 5 and FIG. 6 respectively. Details 416 may comprise a selectable option which, when selected, provides additional information relating to the item of mail extracted from the item of mail.

FIG. 5 depicts an example improved graphical user interface where a quickview option has been selected. Selecting the quickview option 414 in interface 400 may comprise clicking, highlighting, scrolling over, or otherwise providing input selecting the quickview option. The quickview option 414, when selected, causes display of a scanned image of the item of mail. Mail image 502 comprises an image of an item of mail that is displayed in response to a selection of the quickview option 414, thereby allowing a visual review of the item of mail in addition to a review of extracted data.

FIG. 6 depicts an example improved graphical user interface where an options option has been selected. Selecting options 418 in interface 400 may comprise clicking, highlighting, scrolling over, or otherwise providing input selecting options 418. Options 418, when selected, causes display of possible actions 602 to take with respect to the corresponding item of mail, thereby allowing individual processing. The actions depicted in FIG. 6 include forwarding the item of mail, rejecting the item of mail, deleting the record for the item of mail, marking the item of mail as spam, archiving the item of mail, causing physical delivery of the item of mail, and exporting the item of mail to an external system.

The interfaces of FIG. 4-6 provide improvements in viewing and processing of incoming mail items. The interfaces provide specific examples of improvements from executing the methods described herein and other improved interfaces may have different appearances and/or display different information. For example, an interface may depict individual items of mail with a drop-down menu for specifying a category of a preset list of categories. Whereas in FIG. 6 an action is specifically selected, in the category selection situation, the selection of the category may cause the system to perform the action associated with the category. Additionally and/or alternatively, a selection of a category for an item of mail may cause the system to generate a training dataset to use to train a machine learning system to detect categories from items of mail.

In an embodiment, similar approaches are taken with respect to digital mail items, such as e-mail, text messages, in-app messages, and/or facsimiles. An improved interface may include identifiers of both the physical mail items and the digital mail items. The improved interface may include a column indicating a source of the mail item with such options as "physical", "e-mail", "fax", etc. By combining messages from different source types into a single interface, the system provides improvements in displays of received messages, thereby creating easier management of received messages. For instance, a physical mail item received from a particular source can be correlated to a digital mail item received from the particular source, thereby ensuring that a viewer of the messages does not perform repeat actions. Storage and processing costs are also reduced by providing a single interface view which provides options for viewing mail items received from different sources.

In an embodiment, improvements to the graphical user interface comprise generating recommendations based on category and/or priority determinations. For example, the system may be configured to generate alerts and/or recommendations in response to determining that a number of mail items with high priority is greater than a stored threshold value, such as ten items. As another example, the system may be configured to generate recommendations for different services in response to determining that a percentage and/or number of mail items within a particular category is greater than a threshold value. Thus, if a user receives a large number of mail items that are identified as insurance claims, the system may be configured to generate a recommendation for claims processing software.

In an embodiment, the improved interfaces include options for specifying one or more users that are authorized to act on items of mail. The options may include options for limiting the types of mail a user is authorized to access and/or act on based on a priority level of the item of mail and/or determined category of the item of mail. For example, an interface may include options for selecting users, selecting categories and/or priority levels of mail items that the user can act on, and/or selecting types of actions a user may perform. Thus, the categorization and/or priority determination may be used to route mail items to individuals and/or enforce access controls whereby a mail item is determined to be accessible or inaccessible to a user based on a determined category and/or priority level.

Figure 8:
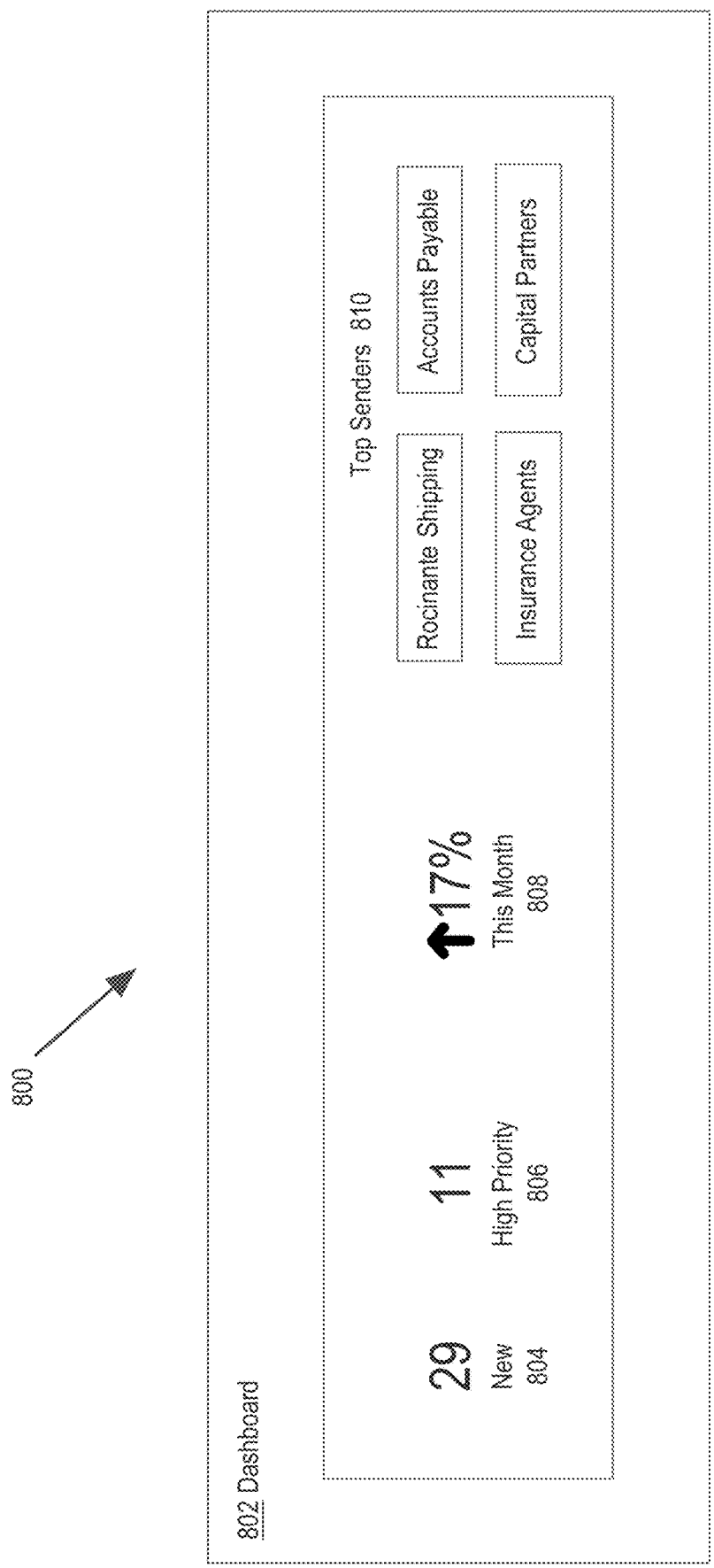
FIG. 8 depicts an improved graphical user interface.

FIG. 8 depicts an improved graphical user interface. Interface 800 comprises dashboard 802. Dashboard 802 may comprise a landing page and/or an interface designed to provide a high level view of received mail items. In an embodiment, dashboard 802 may be related to different levels of granularity based on user selection. For example, dashboard 802 may depict information for mail items sent to a particular recipient, to a group of recipients, to recipients at a particular mailing address, and/or to all recipients within an entity. The system may store data identifying permissions for different users. The permissions may specify which levels of granularity a user may view. For example, a permission may specify that a user can view mail directed to that user individually, directed to a second user individually, or directed to a particular group of users. The system may provide options through interface 800 for selecting which level of granularity and/or which user to provide the basis for dashboard 802.

Dashboard 802 identifies new mail items 804, high priority mail items 806, a change in received mail items 808, and top senders 810. New mail items 802 identifies a number of new mail items that have been received but not viewed. In response to a selection of new mail items 802, the system may cause display of an interface similar to interface 400 which depicts only the new mail items. High priority mail items 806 identifies a number of mail items that were identified as high priority that have not been processed. In response to a selection of high priority items 806, the system may cause display of an interface similar to interface 400 which depicts on the high priority mail items. Change in received mail items 808 identifies an increase or decrease in mail items between a current month and a previous month. In response to a selection of change in received mail items 808, the system may cause display of an interface including one or more graphs which depict analytics relating to received mail items, such as number of mail items received each month. Top senders 810 identifies one or more sender names corresponding to the highest number of received mail items. In response to a selection of a particular sender of top senders 810, the system may cause display of an interface similar to interface 400 which depicts only mail items sent by the particular sender.

In an embodiment, the system provides analytics using information extracted from received mail items. An analytics display may be configured to provide information relating to particular users or groups of users depending on a viewer's permissions. The analytics display may provide graphs or other analytics depicting a percentage of received items that are listed as priority items, an average processing time of high priority items, percentages of mail items that fall into different categories, and/or percentages of actions taken with respect to different documents. These analytics may provide critical insight into how inbound communications are being handled, how quickly they are being processed, and what types of communications are being received. By providing options of changing the display to show different analytics for different users or groups, the system provides functionality for evaluating how mail is treated for an entire ecosystem, a particular team, a department, a region, or individual users.

VI. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
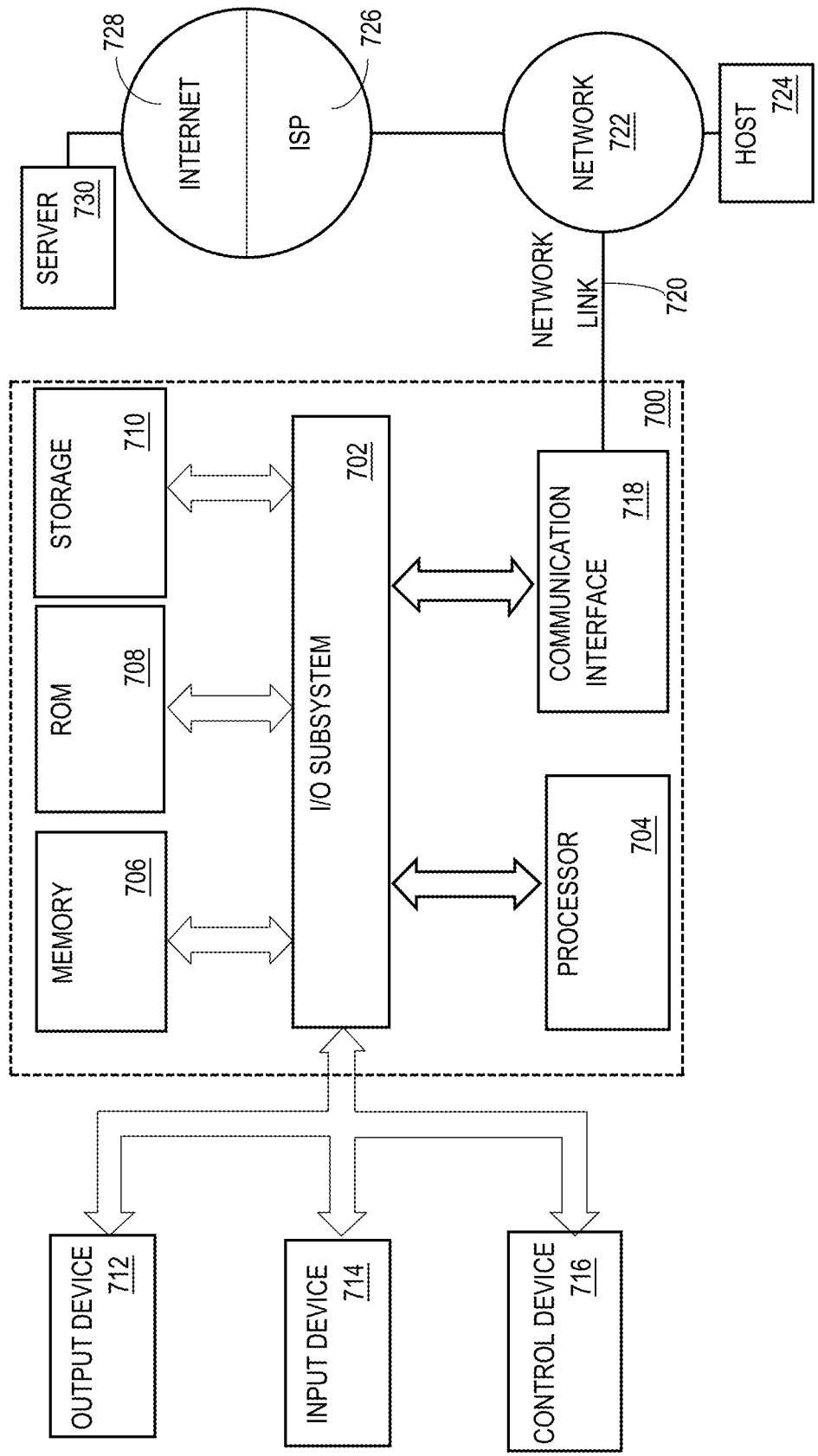
FIG. 7 is a block diagram that illustrates an example computer system with which an embodiment may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 770.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 770 may be coupled to internet 728. Server 770 broadly represents any computer, data center, virtual machine or virtual computing instance with or without a hypervisor, or computer executing a containerized program system such as DOCKER or KUBERNETES. Server 770 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 770 may form elements of a distributed computing system that includes other computers, a processing cluster, server farm or other organization of computers that cooperate to perform tasks or execute applications or services. Server 770 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 770 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 770 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. An apparatus comprising:
   one or more processors; and
   one or more memories communicatively coupled to the one or more processors and storing instructions which, when processed by the one or more processors, cause:
   causing displaying, on a client computing device, a graphical user interface comprising first options for selecting categories of mail and second options for specifying actions to automatically perform for the categories of mail;
   receiving, through the graphical user interface, input that specifies a particular category of the categories and a particular action of the actions;
   based on receiving the input, causing storing, at a server computer, a rule that comprises the particular category and the particular action;
   capturing a first digital image of an item of mail using an image capture device, the item of mail comprising a physical item;
   capturing a second digital image of one or more contents of the item of mail using the image capture device;
   extracting, by an image processing device, information from one or more of the first digital image of the item of mail or the second digital image of the one or more contents of the item of mail, the extracted information comprising identifying data and characteristic data;
   based, at least in part, on the characteristic data from one of the first or second digital images, determining that category for the item of mail is the particular category;
   based on the rule and determining that the category is the particular category, causing the particular action to be performed with respect to the item of mail.

2. The apparatus of claim 1, wherein the instructions, when processed by the one or more processors, cause:
   storing action data defining one or more actions and corresponding categories;
   based on the category for the item of mail, identifying a particular action from the action data and causing performance of the particular action.

3. The apparatus of claim 2, wherein the one or more actions comprise one or more of:
   sending the second digital image of the one or more contents of the item of mail to a client computing device,
   rejecting the item of mail, deleting the second digital image of the one or more contents of the item of mail, marking the item of mail as spam, causing the item of mail to be separated for physical delivery, or exporting the second digital image of the one or more contents of the item of mail to a content management system.

4. The apparatus of claim 1, wherein the characteristic data comprises a sentiment of written contents of the item of mail extracted using natural language processing and wherein determining a priority level for the item comprises determining that the tone of the written contents of the item corresponds to the priority level.

5. The apparatus of claim 1, wherein the characteristic data comprises the particular a category of the item of mail and wherein determining the priority level for the item of mail comprises determining that the particular category corresponds to the priority level.

6. The apparatus of claim 5, wherein determining the particular category for the item of mail comprises using a machine learning system trained using datasets comprising inputs of a plurality of documents and outputs comprising categories of the plurality of documents, computing the category using, as an input into the machine learning system, the second digital image of the one or more contents of the item of mail or a document generated through optical character recognition (OCR) of the second digital image of the one or more contents of the item of mail.

7. The apparatus of claim 1, wherein the instructions, when processed by the one or more processors, further cause:

receiving a digital mail item;

causing displaying, through the graphical user interface on the client computing device, an identifier of the digital mail item along with the identifying data and a priority level for the item of mail.

8. One or more non-transitory computer-readable media storing instructions which, when processed by one or more processors, cause:

for each item of mail of a plurality of items of mail:
capturing a first digital image of said each item of mail using an image capture device;
capturing a second digital image of one or more contents of said each item of mail using the image capture device;
extracting, by an image processing device, information from one or more of the first digital image of said each item of mail or the second digital image of the one or more contents of said each item of mail, the extracted information comprising identifying data and characteristic data;
based, at least in part, on the characteristic data from one of the first or second digital images, determining a priority level for said each item of mail;

wherein a first set of items of mail in the plurality of items of mail have a first priority level of a plurality of priority levels;

wherein a second set of items of mail in the plurality of items of mail have a second priority level, of the plurality of priority levels, that is different than the first priority level;

causing displaying, on a client computing device, a graphical user interface for accessing (1) first data that indicates a number of items of mail in each priority level of a plurality of priority levels and (2) second data that indicates an amount of time to process sets of items of mail corresponding to each priority level of the plurality of priority levels.

9. The one or more non-transitory computer-readable media of claim 8, wherein the instructions, when processed by the one or more processors, cause:

storing action data defining one or more actions and corresponding priority levels;

based on the priority level for the item of mail, identifying a particular action from the action data and causing performance of the particular action.

10. The one or more non-transitory computer-readable media of claim 9, wherein the one or more actions comprise one or more of sending the second digital image of the one or more contents of the item of mail to a client computing device, rejecting the item of mail, deleting the second digital image of the one or more contents of the item of mail, causing the item of mail to be separated for physical delivery, or exporting the second digital image of the one or more contents of the item of mail to a content management system.

11. The one or more non-transitory computer-readable media of claim 8, wherein the characteristic data comprises a tone of written contents of the item of mail extracted using natural language processing and wherein determining the priority level for the item comprises determining that the tone of the written contents of the item corresponds to the priority level.

12. The one or more non-transitory computer-readable media of claim 8, wherein the characteristic data comprises a category of the item of mail and wherein determining the priority level for the item of mail comprises determining that the category corresponds to the priority level.

13. The one or more non-transitory computer-readable media of claim 12, wherein determining the category for the item of mail comprises using a machine learning system trained using datasets comprising inputs of a plurality of documents and outputs comprising categories of the plurality of documents, computing the category using, as an input into the machine learning system, the second digital image of the one or more contents of the item of mail or a document generated through optical character recognition (OCR) of the second digital image of the one or more contents of the item of mail.

14. A method comprising:

capturing a first digital image of an item of mail using an image capture device, the item of mail comprising a physical item;

capturing a second digital image of one or more contents of the item of mail using the image capture device;

extracting, by an image processing device, information from one or more of the first digital image of the item of mail or the second digital image of the one or more contents of the item of mail, the extracted information comprising identifying data and characteristic data;

based, at least in part, on the characteristic data from one of the first or second digital images, determining a priority level for the item of mail;

causing displaying, on a client computing device, a graphical user interface comprising the identifying data and the priority level for the item of mail storing action data defining one or more actions and corresponding priority levels;

based on the priority level for the item of mail, identifying a particular action from the action data and causing performance of the particular action;

wherein the one or more actions comprise one or more of:
sending the second digital image of the one or more contents of the item of mail to a client computing device,
causing the item of mail to be separated for physical delivery, or
exporting the second digital image of the one or more contents of the item of mail to a content management system.

15. The method of claim 14, further comprising:
storing action data defining one or more actions and corresponding priority levels;
based on the priority level for the item of mail, identifying a particular action from the action data and causing performance of the particular action, wherein the one or more actions comprise one or more of sending the second digital image of the one or more contents of the item of mail to a client computing device, rejecting the item of mail, deleting the second digital image of the one or more contents of the item of mail, causing the item of mail to be separated for physical delivery, and exporting the second digital image of the one or more contents of the item of mail to a content management system.

16. The method of claim 14, wherein the characteristic data comprises a tone of written contents of the item of mail extracted using natural language processing and wherein determining the priority level for the item comprises determining that the tone of the written contents of the item corresponds to the priority level.

17. The method of claim 14, wherein the characteristic data comprises a category of the item of mail and wherein determining the priority level for the item of mail comprises determining that the category corresponds to the priority level.

18. The method of claim 17, wherein determining the category for the item of mail comprises using a machine learning system trained using datasets comprising inputs of a plurality of documents and outputs comprising categories of the plurality of documents, computing the category using, as an input into the machine learning system, the second digital image of the one or more contents of the item of mail or a document generated through optical character recognition (OCR) of the second digital image of the one or more contents of the item of mail.

* * * * *